(12) United States Patent
Li et al.

(10) Patent No.: US 11,276,207 B2
(45) Date of Patent: Mar. 15, 2022

(54) IMAGE PROCESSING METHOD, STORAGE MEDIUM, AND COMPUTER DEVICE

(71) Applicant: TENCENT TECHNOLOGY (SHENZHEN) COMPANY LIMITED, Shenzhen (CN)

(72) Inventors: Minjun Li, Shenzhen (CN); Haozhi Huang, Shenzhen (CN); Lin Ma, Shenzhen (CN); Wei Liu, Shenzhen (CN); Yugang Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 29 days.

(21) Appl. No.: 16/880,883

(22) Filed: May 21, 2020

(65) Prior Publication Data
US 2020/0286263 A1 Sep. 10, 2020

Related U.S. Application Data

(63) Continuation of application No. PCT/CN2019/072491, filed on Jan. 21, 2019.

(30) Foreign Application Priority Data

Jan. 26, 2018 (CN) .......................... 201810078544.8

(51) Int. Cl.
*G06T 11/00* (2006.01)
*G06T 3/40* (2006.01)
*G06T 9/00* (2006.01)

(52) U.S. Cl.
CPC .............. *G06T 11/001* (2013.01); *G06T 3/40* (2013.01); *G06T 9/00* (2013.01); *G06T 2207/20081* (2013.01)

(58) Field of Classification Search
CPC . G06T 11/001; G06T 3/40; G06T 9/00; G06T 2207/20081; G06T 5/00;
(Continued)

(56) References Cited

U.S. PATENT DOCUMENTS 8,885,976 B1 * 11/2014 Kuo .................... G06T 5/008
382/276
9,053,558 B2 * 6/2015 Shen ..................... G06T 5/009

FOREIGN PATENT DOCUMENTS

AU 2017101166 A4 11/2017
CN 103617596 A 3/2014
(Continued)

OTHER PUBLICATIONS

The World Intellectual Property Organization (WIPO) International Search Report for PCT/CN2019/072491 dated Apr. 26, 2019 5 Pages (including translation).
(Continued)

*Primary Examiner* — Phuoc Tran
(74) *Attorney, Agent, or Firm* — Anova Law Group, PLLC

(57) ABSTRACT

An image processing method for a computer device. The method includes obtaining a to-be-processed image belonging to a first image category; inputting the to-be-processed image into a first stage image conversion model, to obtain a first intermediate image; and converting the first intermediate image into a second intermediate image through a second stage image conversion model. The method also includes determining a first weight matrix corresponding to the first intermediate image; determining a second weight matrix corresponding to the second intermediate image; and fusing the first intermediate image and the second intermediate image according to the corresponding first weight matrix and second weight matrix, to obtain a target image corresponding to the to-be-processed image and belonging to a
(Continued)

second image category. A sum of the first weight matrix and the second weight matrix being a preset matrix.

18 Claims, 8 Drawing Sheets

(58) Field of Classification Search
CPC ......... G06T 2207/20084; G06T 3/0012; G06T 5/50; G06T 2207/20221; G06N 3/0481; G06N 3/08; G06N 3/0454; G06N 20/10
See application file for complete search history.

(56) References Cited

FOREIGN PATENT DOCUMENTS

| CN | 106373109 A | 2/2017 |
|----|-------------|--------|
| CN | 106651766 A | 5/2017 |
| CN | 107220929 A | 9/2017 |
| CN | 107516290 A | 12/2017 |
| CN | 108305238 A | 7/2018 |

OTHER PUBLICATIONS

H. Huang et al., "Real-Time Neural Style Transfer for Videos", 2017 IEEE Conference on Computer Vision and Pattern Recognition (CVPR), Jul. 21, 2017 (Jul. 21, 2017), ISSN: 1063-6919, text, p. 7046 and figure 2 9 pages.

J-Y. Zhu et al., "Unpaired image-to-image translation using cycle-consistent adversarial networks", Proceedings of ICCV, 2017, pp. 2223-2232 10 pages.

I. Goodfellow et al., "Generative adversarial nets", In Proceedings of NIPS, 2014. 9 pages.

The State Intellectual Property Office of the People's Republic of China (SIPO) Office Action 1 for for 201810078544.8 dated Mar. 16, 2021 10 Pages (including translation).

The European Patent Office (EPO) The Extended European Search Report for 19743676.9 dated Sep. 17, 2021 9 pages.

Luan Tran et al. "Representation Learning by Rotating Your Faces," arXiv:1705.11136, May 31, 2017 (May 31, 2017). 14 pages.

* cited by examiner

IMAGE PROCESSING METHOD, STORAGE MEDIUM, AND COMPUTER DEVICE

RELATED APPLICATIONS

This application is a continuation application of PCT Patent Application No. PCT/CN2019/072491, filed on Jan. 21, 2019, which claims priority to Chinese Patent Application No. 2018100785448, filed with the Chinese Patent Office on Jan. 26, 2018 and entitled "IMAGE PROCESSING METHOD AND APPARATUS, STORAGE MEDIUM, AND COMPUTER DEVICE", content of all of which is incorporated herein by reference in its entirety.

FIELD OF THE TECHNOLOGY

This application relates to the field of computer technologies and, in particular, to an image processing method, a storage medium, and a computer device.

BACKGROUND

With the development of computer technologies and the progress of image processing technologies, methods of image processing are more diverse. Currently, a common image processing technology, for example, performs image feature conversion processing, such as image color feature conversion, image light and shadow feature conversion, or image style feature conversion.

However, in a conventional image processing procedure, image texture of a target feature is spread to an image area of a to-be-processed image mainly in a manner based on texture synthesis, to implement image feature conversion processing. A mismatch easily occurs when this manner is used for processing, leading to distortion of an obtained image. The disclosed methods and systems are directed to solve one or more problems set forth above and other problems.

SUMMARY

One aspect of the present disclosure includes an image processing method for a computer device. The method includes obtaining a to-be-processed image belonging to a first image category; inputting the to-be-processed image into a first stage image conversion model, to obtain a first intermediate image; and converting the first intermediate image into a second intermediate image through a second stage image conversion model. The method also includes determining a first weight matrix corresponding to the first intermediate image; determining a second weight matrix corresponding to the second intermediate image; and fusing the first intermediate image and the second intermediate image according to the corresponding first weight matrix and second weight matrix, to obtain a target image corresponding to the to-be-processed image and belonging to a second image category. A sum of the first weight matrix and the second weight matrix being a preset matrix.

Another aspect of the present disclosure includes a computer device. The computer device includes a memory storing computer-readable instructions, and a processor coupled to the memory. The processor executes the computer-readable instructions to perform: obtaining a to-be-processed image belonging to a first image category; inputting the to-be-processed image into a first stage image conversion model, to obtain a first intermediate image; converting the first intermediate image into a second intermediate image through a second stage image conversion model; determining a second weight matrix corresponding to the second intermediate image; determining a first weight matrix corresponding to the first intermediate image; and fusing the first intermediate image and the second intermediate image according to the corresponding first weight matrix and second weight matrix, to obtain a target image corresponding to the to-be-processed image and belonging to a second image category. A sum of the first weight matrix and the second weight matrix being a preset matrix.

Another aspect of the present disclosure includes a non-volatile computer-readable storage medium storing computer program instructions. The computer program instructions are executable by at least one processor to perform: obtaining a to-be-processed image belonging to a first image category; inputting the to-be-processed image into a first stage image conversion model, to obtain a first intermediate image; converting the first intermediate image into a second intermediate image through a second stage image conversion model; determining a second weight matrix corresponding to the second intermediate image; determining a first weight matrix corresponding to the first intermediate image; and fusing the first intermediate image and the second intermediate image according to the corresponding first weight matrix and second weight matrix, to obtain a target image corresponding to the to-be-processed image and belonging to a second image category. A sum of the first weight matrix and the second weight matrix being a preset matrix.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solution in this disclosure more clearly, a brief introduction is made below to accompanying drawings. Obviously, the accompanying drawings described below are merely some embodiments of the present disclosure, and for a person skilled in the art, other drawings may be further obtained according to the accompanying drawings without creative efforts.

DETAILED DESCRIPTION

To make the objectives, technical solutions, and advantages of the present disclosure clearer and more understandable, the present disclosure is further described in detail below with reference to accompanying drawings. It is to be understood that the specific embodiments described herein are merely used for explaining the present disclosure, and not limiting the present disclosure.

Figure 1:
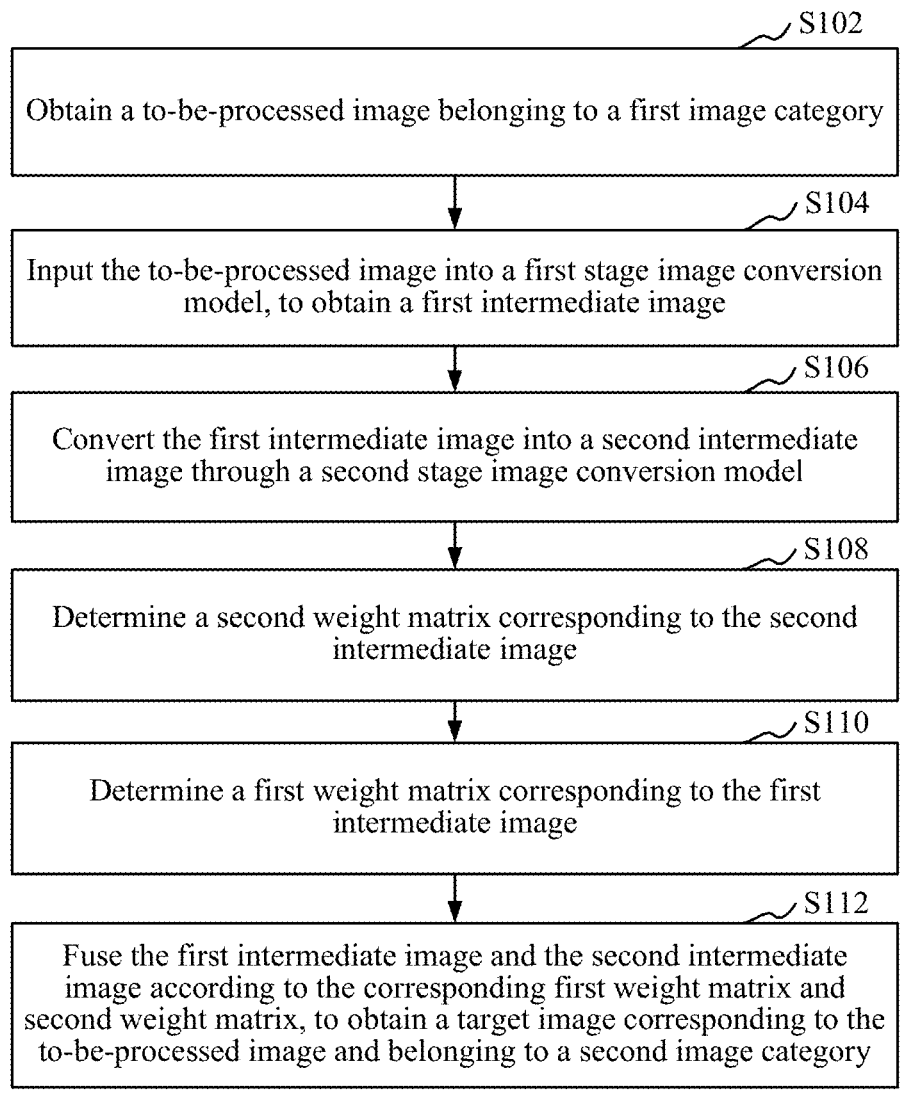
FIG. 1 is a schematic flowchart of an image processing method according to an embodiment of the present disclosure.

FIG. 1 is a schematic flowchart of an image processing method according to an embodiment. In one embodiment, an example of applying the method to a computer device is mainly used for description. Referring to FIG. 1, the image processing method specifically includes the followings.

S102: Obtain a to-be-processed image belonging to a first image category.

An image category is a category to which an image feature reflected by an image belongs. The image feature may be specifically a color feature, a style feature, a content feature, or the like. Correspondingly, an image category obtained by performing classification according to the color feature is, for example, a black and white image category or a color image category; an image category obtained by performing classification according to the style feature is, for example, a sketch image category or an oil painting image category; and an image category obtained by performing classification according to the content feature is, for example, an apple image category or an orange image category.

Specifically, the to-be-processed image is an image on which image category conversion is to be performed. The computer device may be a user terminal. The user terminal may directly obtain a to-be-processed image that is uploaded by a user and that belongs to an image category, or may receive a to-be-processed image that is transmitted by another user terminal and that belongs to an image category. The computer device may alternatively be a server. The server may receive a to-be-processed image that is uploaded by a user terminal and that belongs to an image category.

S104: Input the to-be-processed image into a first stage image conversion model, to obtain a first intermediate image.

The image conversion is converting an image of an image category into an image of another image category. The image conversion model may be a machine learning model having an image conversion capability after being trained. Machine learning as a full name is briefly referred to as ML. The machine learning model may be a neural network model, a support vector machine (SVM), a logistic regression model, or the like.

The first stage image conversion model is used for preliminarily converting an image of the first image category into an image of a second image category. An error is allowed to some extent between an image obtained by conversion through the first stage image conversion model and an image, which is to be converted into, of the second image category. It may be understood that, an image detail feature conversion capability of the first stage image conversion model is not limited herein, as long as the conversion is completed on entire features of the image.

Specifically, the computer device may obtain the first stage image conversion model through training in advance according to a first sample belonging to the first image category and a second sample belonging to the second image category. In one embodiment, the first stage image conversion model may specifically use a convolutional neural network model. A structure of the convolutional neural network model may be specifically an encoder-decoder structure. The encoder may be formed by a plurality of convolution layers, and the decoder may be formed by a plurality of deconvolution layers. The encoder part converts the input image into a feature image with a low resolution and a larger number of channels, where the feature image may be seen as encoding on the original image. The decoder part decodes the feature image into the image of the second image category.

Figure 2:
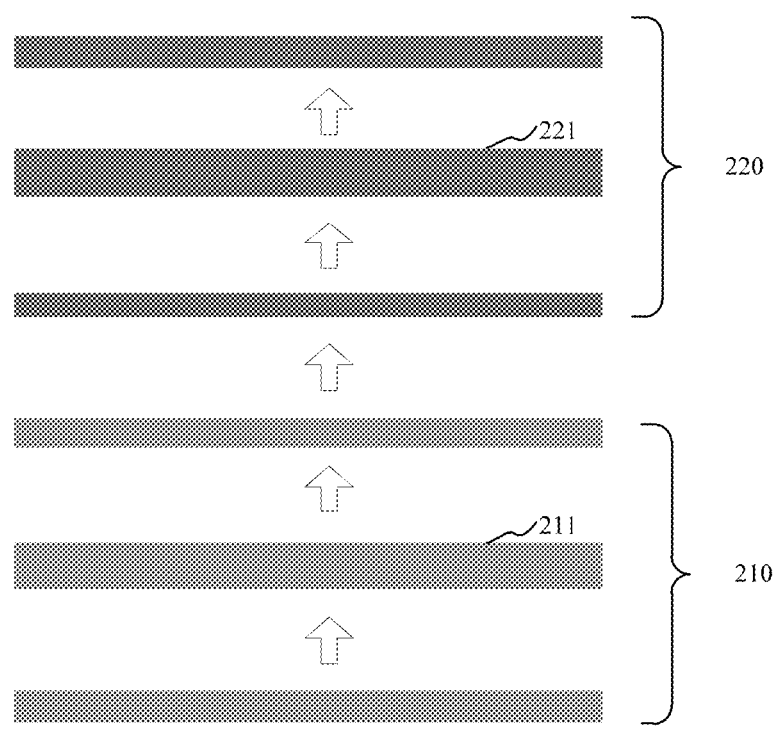
FIG. 2 is a schematic model diagram of a first stage image conversion model according to an embodiment of the present disclosure.

For example, FIG. 2 is a schematic model diagram of a first stage image conversion model according to an embodiment. Referring to FIG. 2, the first stage image conversion model is an encoder-decoder structure. An encoder structure 210 includes three convolution layers 211, and a decoder structure 220 includes three deconvolution layers 221.

In an embodiment, during training of the first stage image conversion model, when the first sample belonging to the first image category is in a one-to-one correspondence with the second sample belonging to the second image category, the second sample corresponding to the first sample is used as a training label of the first sample, so that the first stage image conversion model is obtained through training under supervision according to the first sample and the corresponding training label.

In an embodiment, during training of the first stage image conversion model, when there is neither the second sample corresponding to the first sample nor the first sample corresponding to the second sample, a first stage image conversion model converting an image of the first image category into an image of the second image category, and a first stage image reverse conversion model converting an image of the second image category into an image of the first image category are constructed. The first sample is made to sequentially pass through the first stage image conversion model and the first stage image reverse conversion model to form a closed loop, and the second sample is made to sequentially pass through the first stage image reverse conversion model and the first stage image conversion model to form a closed loop, so that the first stage image conversion model is obtained through training without supervision by using a cycle consistency constraint.

It may be understood that, that the first sample corresponds to the second sample is that aside from an image feature used for distinguishing categories, other image features of the first sample and the second sample are the same. For example, the first image category is the black and white image category, and the second image category is the color image category. For an apple image, only colors of an apple in the first sample and an apple in the second sample are different, and sizes, shapes or locations are the same.

Figure 3:
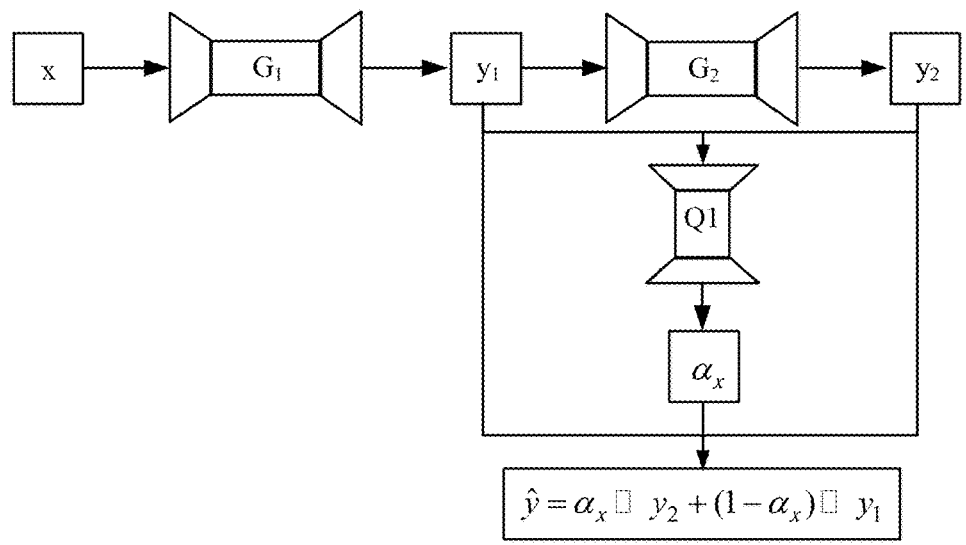
FIG. 3 is a schematic logical diagram of an image processing procedure according to an embodiment of the present disclosure.

FIG. 3 is a schematic logical diagram of an image processing procedure according to an embodiment. Referring to FIG. 3, the computer device may input a to-be-processed image x belonging to a first image category A into a first stage image conversion model G1, to obtain a first intermediate image y1 outputted by the first stage image conversion model G1.

In one embodiment, the image conversion may be conversion of non-image content, for example, image style conversion, image color conversion or image depth of field conversion. The image conversion may alternatively be conversion of image content, for example, modifying an item in an image. Specifically, an apple image of an apple image category is modified into an orange image of an orange image category.

S106: Convert the first intermediate image into a second intermediate image through a second stage image conversion model.

The second stage image conversion model is used for further converting the image outputted by the first stage image conversion model into the image of the second image category. It may be understood that, the second stage image conversion model is required to complete the conversion on image detail features herein.

Specifically, the computer device may obtain the second stage image conversion model through training in advance according to the first intermediate image outputted by the first stage image conversion model and the second sample belonging to the second image category. In one embodiment, the second stage image conversion model may specifically use a convolutional neural network model. A structure of the convolutional neural network model may be specifically an encoder-decoder structure. The encoder may be formed by a plurality of convolution layers, and the decoder may be formed by a plurality of deconvolution layers.

In an embodiment, during training of the second stage image conversion model, when the first sample belonging to the first image category is in a one-to-one correspondence with the second sample belonging to the second image category, the second sample corresponding to the first sample is used as a training label of the first intermediate image corresponding to the first sample, so that the second stage image conversion model is obtained through training under supervision according to the first intermediate image and the corresponding training label.

In an embodiment, during training of the first stage image conversion model, when there is neither the second sample corresponding to the first sample nor the first sample corresponding to the second sample, a second stage image conversion model converting the first intermediate image into an image of the second image category, and a second stage image reverse conversion model converting an image of the second image category into the first intermediate image are constructed. The first sample is made to sequentially pass through the first stage image conversion model, the second stage image conversion model, the first stage image reverse conversion model and the second stage image reverse conversion model to form a closed loop, and the second sample is made to sequentially pass through the first stage image reverse conversion model, the second stage image reverse conversion model, the first stage image conversion model and the second stage image conversion model to form a closed loop, so that the second stage image conversion model is obtained through training without supervision by using a cycle consistency constraint.

Referring to FIG. 3, after obtaining the first intermediate image y1 outputted by the first stage image conversion model G1, the computer device may continue to input the first intermediate image y1 into a second stage image conversion model G2, to obtain a second intermediate image y2 outputted by the second stage image conversion model G2.

S108: Determine a second weight matrix corresponding to the second intermediate image.

The weight is a relative concept for an object. A weight of an object reflects a relative importance level of the object in overall evaluation. Because the computer device, when processing an image, usually performs processing by using digital image data in a matrix form, a weight of the image is also in a matrix form.

In an embodiment, the computer device may preset a weight mapping function, so that a weight matrix corresponding to the second intermediate image is obtained by mapping through the weight mapping function. Specifically, there may be a plurality of types of weight mapping functions that may be preset by the computer device. The computer device may use the to-be-processed image and the second intermediate image as independent variables of the weight mapping function, to obtain a weight matrix corresponding to the intermediate image that is used as an independent variable.

S110: Determine a first weight matrix corresponding to the first intermediate image.

Specifically, the computer device may use the to-be-processed image and the first intermediate image as independent variables of the weight mapping function, to obtain a weight matrix corresponding to the intermediate image that is used as an independent variable.

In an embodiment, the computer device may also use the to-be-processed image, the first intermediate image, and the second intermediate image as independent variables of the weight mapping function, to obtain a weight matrix corresponding to one of the intermediate images, and further obtain, according to the weight matrix, a weight matrix corresponding to another intermediate image. The computer device may further use the first intermediate image and the second intermediate image as independent variables of the weight mapping function, to obtain a weight matrix corresponding to one of the intermediate images, and further obtain, according to the weight matrix, a weight matrix corresponding to another intermediate image. The one of the intermediate images may be the first intermediate image, or may be the second intermediate image. It may be understood that, a sequence of performing S108 and S110 is not limited herein. S108 may be performed before S110, or may be performed after S110, or may be synchronously performed with S110. The sequence of performing S108 and S110 is based on the weight mapping function preset by the computer device.

In an embodiment, S108 includes: inputting the to-be-processed image, the first intermediate image and the second intermediate image jointly into a first weight prediction model, to obtain the second weight matrix corresponding to the second intermediate image. S110 includes: obtaining the first weight matrix corresponding to the first intermediate image according to the second weight matrix, a sum of the first weight matrix and the second weight matrix being a preset matrix.

The weight prediction model is a machine learning model having a weight prediction capability after being trained. In one embodiment, the weight prediction model may specifically use a shallow convolutional neural network model. For example, the shallow convolutional neural network model may be formed by three convolution layers. Structures of the first two convolution layers are both a Convolution-InstanceNorm-ReLU structure, and a structure of the last convolution layer is a Convolution-Sigmoid structure.

The first weight prediction model is a machine learning model performing weight prediction when the image of the first image category is converted into the image of the second image category. A second weight prediction model mentioned in the following is a machine learning model performing weight prediction when the image of the second image category is converted into the image of the first image category.

The to-be-processed image, the first intermediate image, and the second intermediate image are inputted into the first weight prediction model, where image sizes of the three frames of images are the same. The first weight prediction model outputs a weight matrix corresponding to the size of the input image, and each element of the weight matrix represents a weight of a pixel value of the second intermediate image in a corresponding pixel location. The first weight matrix and the second weight matrix are matrices of the same size and the same number of dimensions. In addition, a sum of the first weight matrix and the second weight matrix is a preset matrix. The preset matrix may be specifically an all-ones matrix, where a size and a number of dimensions of the all-ones matrix is the same as those of the second weight matrix. Matrix elements of the all-ones matrix are all one.

Specifically, the computer device may input the to-be-processed image, the first intermediate image and the second intermediate image jointly into the first weight prediction model, to obtain the second weight matrix that corresponds to the second intermediate image and that is outputted by the first weight prediction model. The sum of the first weight matrix corresponding to the first intermediate image and the second weight matrix corresponding to the second intermediate image is the preset matrix. The computer device may obtain the first weight matrix corresponding to the first intermediate image by subtracting the second weight matrix corresponding to the second intermediate image from the preset matrix.

Referring to FIG. 3, the computer device inputs the first intermediate image y1 outputted by the first stage image conversion model G1 and the second intermediate image y2 outputted by the second stage image conversion model G2 jointly into a first weight prediction model Gf, to obtain a weight matrix that corresponds to the second intermediate image y2 and that is outputted by the first weight prediction model Gf, and further obtain a weight matrix corresponding to the first intermediate image y1.

In one embodiment, weight prediction learning is performed by using a strong learning and representation capability of the machine learning model, and the weight is predicted by the machine learning model that is obtained through training. Compared to a conventional method, a weight process is better predicted.

S112: Fuse the first intermediate image and the second intermediate image according to the corresponding first weight matrix and second weight matrix, to obtain a target image corresponding to the to-be-processed image and belonging to a second image category.

Specifically, the computer device may perform weighted summation on the first intermediate image and the second intermediate image according to the respective corresponding weight matrices, to obtain the target image corresponding to the to-be-processed image and belonging to the second image category.

In an embodiment, the first intermediate image and the second intermediate image are fused according to the respective corresponding weight matrices through an adaptive fusion layer, to obtain the target image corresponding to the to-be-processed image and belonging to the second image category.

In an embodiment, S112 includes: multiplying pixel values of the first intermediate image by matrix elements of the first weight matrix in bit, to obtain a first target image belonging to the second image category; multiplying pixel values of the second intermediate image by matrix elements of the second weight matrix in bit, to obtain a second target image belonging to the second image category; and obtaining, according to the first target image and the second target image, the target image corresponding to the to-be-processed image and belonging to the second image category.

A size of a pixel matrix formed by pixels of each intermediate image is the same as the size of the weight matrix corresponding to the intermediate image. In this case, there are weight elements, which are in a one-to-one correspondence with all pixel elements in the pixel matrix, in the weight matrix, that is, each weight element in the weight matrix represents a weight of a pixel value of a corresponding pixel element in the corresponding intermediate image.

Specifically, the computer device multiplies the pixel values of the first intermediate image by the matrix elements of the first weight matrix in bit, to obtain the first target image belonging to the second image category; multiplies the pixel values of the second intermediate image by the matrix elements of the second weight matrix in bit, to obtain the second target image belonging to the second image category; and adds the pixel values of the first intermediate image to the pixel values of the second intermediate image in bit, to obtain the target image corresponding to the to-be-processed image and belonging to the second image category.

Referring to FIG. 3, the computer device may obtain a fused target image through calculation according to the first intermediate image y1, the corresponding weight matrix thereof, the second intermediate image y2 and the corresponding weight matrix thereof.

In one embodiment, outputs of models in a plurality of stages are fused in the finally obtained target image, so that a problem of image distortion can be resolved, and an image conversion effect can be improved.

In the foregoing image processing method, when a to-be-processed image belonging to a first image category is to be converted into an image of a second image category, the to-be-processed image is automatically made to sequentially pass through a first stage image conversion model and a second stage image conversion model, and after weight matrices respectively corresponding to outputs of the models of the two stages are respectively determined, the outputs of the two models are adaptively fused according to the corresponding weight matrices, to obtain a target image. In this way, the to-be-processed image is subjected to model processing of a plurality of stages, and the outputs of the models in the plurality of stages are fused in the finally obtained target image, so that a problem of image distortion can be resolved, and a conversion effect of converting the to-be-processed image into the target image can be improved.

In an embodiment, S104 includes: performing downsampling on the to-be-processed image, to obtain a compressed image with a reduced image size; and inputting the compressed image into the first stage image conversion model, to output the first intermediate image with an image size that is the same as the image size of the compressed image. S106 includes: performing up-sampling on the first intermediate image, to obtain an enlarged image with an image size that is the same as an image size of the to-be-processed image; and inputting the enlarged image into the second stage image conversion model, to output the second intermediate image with an image size that is the same as the image size of the enlarged image.

Down-sampling is also referred to a processing manner of performing image compression. An image size of an image on which a down-sampling operation is performed is reduced, and a reduction degree is related to a sampling cycle of down-sampling. Up-sampling is also referred to as image interpolation, which is a processing manner of enlarging an image. An image size of an image on which an up-sampling operation is performed is increased, and an increasing degree is related to a sampling cycle of up-sampling.

Specifically, the computer device may perform a down-sampling operation on the to-be-processed image. A down-sampling manner may be specifically mean sampling or extremum sampling. For example, the down-sampling manner is performing mean sampling on a 2*2 pixel area. Therefore, a pixel value matrix corresponding to the 2*2 pixel area is [1, 2, 3, 4]. Therefore, a pixel value obtained through down-sampling is: (1+2+3+4)/4=2.5. A resolution of an image obtained after the down-sampling operation is reduced to ¼ of a resolution of the to-be-processed image.

The computer device further inputs the compressed image with the reduced image size after down-sampling into the first stage image conversion model, to obtain the first intermediate image, which is outputted by the first stage image conversion model, with an image size that is the same as the image size of the compressed image. Because in this case, the image size of the first intermediate image is less than a size of the to-be-processed image, the computer device needs to perform an up-sampling operation corresponding to the down-sampling operation on the first intermediate image before the first intermediate image is inputted into the second stage image conversion model, so that a resolution of an image obtained after the up-sampling operation is increased to four times of the resolution of the image before the up-sampling operation, to ensure that a resolution of the second intermediate image outputted by the second stage image conversion model is the same as the resolution of the to-be-processed image.

In one embodiment, during conversion of the image of the first stage, the image is converted after being compressed, so that a data volume of the image processed by the model is small. In this way, when a requirement of image conversion precision is low, an image conversion effect can be ensured, and an image conversion time can be shortened.

In an embodiment, the image processing method further includes mode 1 training steps. Steps of training the first stage image conversion model are specifically as follows: obtaining a first sample belonging to the first image category and a second sample belonging to the second image category; making the first sample sequentially pass through the first stage image conversion model and a first stage image reverse conversion model, to obtain a first sample single stage recovery image; making the second sample sequentially pass through the first stage image reverse conversion model and the first stage image conversion model, to obtain a second sample single stage recovery image; and adjusting the first stage image conversion model and the first stage image reverse conversion model according to a difference between the first sample and the first sample single stage recovery image, and a difference between the second sample and the second sample single stage recovery image until training is ended in a case that a training stop condition is satisfied.

The first sample is an image belonging to the first image category, and is used for training the first stage image conversion model and the first stage image reverse conversion model. The second sample is an image belonging to the second image category, and is also used for training the first stage image conversion model and the first stage image reverse conversion model. The first stage image conversion model is a machine learning model converting an image of the first image category into an image of the second image category, and the first stage image reverse conversion model is a machine learning model converting an image of the second image category into an image of the first image category.

The first sample single stage recovery image is an image belonging to the first image category, and is an image that belongs to the first image category and that is obtained after the first sample is converted into the image of the second image category through the first stage image conversion model and then recovered through the first stage image reverse conversion model. The second sample single stage recovery image is an image belonging to the second image category, and is an image that belongs to the second image category and that is obtained after the second sample is converted into the image of the first image category through the first stage image reverse conversion model and then recovered through the first stage image conversion model.

It may be understood that, an applicable scenario is a scenario in which there is neither the second sample corresponding to the first sample nor the first sample corresponding to the second sample, that is, a model training scenario in which there is actually neither an image that belongs to the second image category and that may be used as the training label of the first sample, nor an image that belongs to the first image category and that may be used as the training label of the second sample. Therefore, in one embodiment, by using cycle consistency, the first sample is used as an optimization target of an image recovered after image conversion and image reverse conversion are performed on the first sample, and the second sample is used as an optimization target of an image recovered after image reverse conversion and image conversion are performed on the second sample.

Specifically, the computer device may obtain the first sample belonging to the first image category, and make the first sample sequentially pass through the first stage image conversion model and the first stage image reverse conversion model, to obtain the first sample single stage recovery image. In this case, according to a cycle consistency constraint, the first sample single stage recovery image is an image to be recovered to the first sample. It may be understood that, a training objective of the first stage image conversion model and the first stage image reverse conversion model is a procedure of minimizing a difference between the first sample and the first sample single stage recovery image.

Further, to prevent a plurality of first samples from being converted into the same image after being converted by the first stage image conversion model, the computer device may obtain the second sample belonging to the second image category, and make the second sample sequentially pass through the first stage image reverse conversion model and the first stage image conversion model, to obtain the second sample single stage recovery image. In this case, the second sample single stage recovery image is an image to be recovered to the second sample. It may be understood that, a training objective of the first stage image conversion model and the first stage image reverse conversion model is a procedure of minimizing the difference between the first sample and the first sample single stage recovery image and a difference between the second sample and the second sample single stage recovery image.

The difference between the first sample and the first sample single stage recovery image and the difference between the second sample and the second sample single stage recovery image may be specifically a 1-norm, a 2-norm, or the like of differences between image pixels.

Figure 4:
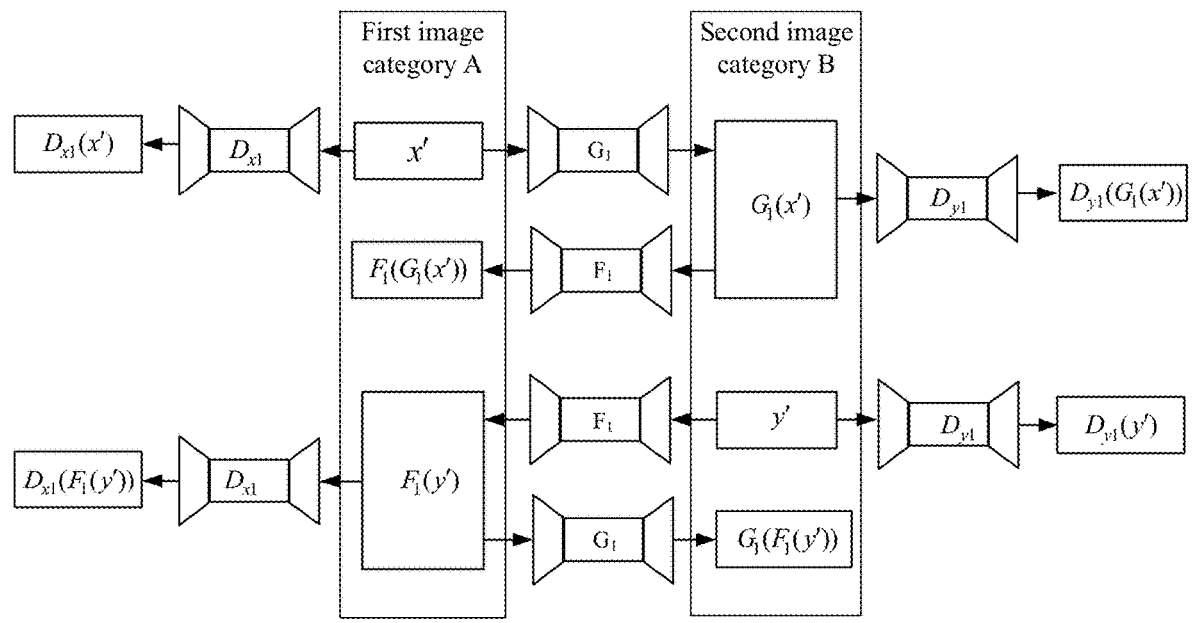
FIG. 4 is a schematic logical diagram of training a first stage image conversion model according to an embodiment of the present disclosure.

For example, FIG. 4 is a schematic logical diagram of training a first stage image conversion model according to an embodiment. Referring to FIG. 4, the computer device may obtain a first sample x' of the first image category A, and sequentially input x' into the first stage image conversion model G1 and a first stage image reverse conversion model F1, to obtain a first sample single stage recovery image $F_1(G_1(x'))$. In this case, $F_1(G_1(x'))$ is an image to be recovered to x'. It may be understood that, a training objective of the model is to minimize a difference between $F_1(G_1(x'))$ and x'. The computer device may further obtain a second sample y' belonging to a second image category B, and sequentially input y' into the first stage image reverse conversion model F1 and the first stage image conversion model G1, to obtain a second sample single stage recovery image $G_1(F_1(y'))$. In this case, $G_1(F_1(y'))$ is an image to be recovered to y'. It may be understood that, a training objective of the model is to minimize a difference between $G_1(F_1(y'))$ and y'.

In this case, in model training of the first stage, the cycle consistency constraint is expressed as:

$$L_{cyc1} = \|F_1(G_1(x')) - x'\|_1 + \|G_1(F_1(y')) - y'\|_1 \quad (1)$$

$L_{cyc1}$ is a loss function based on cycle consistency. A procedure of model training may include a procedure of adjusting model parameters of the first stage image conversion model and the first stage image reverse conversion model to minimize $L_{cyc1}$.

In one embodiment, the machine learning model is trained without supervision by using the cycle consistency constraint, so that a machine learning model converting any two image categories of images into each other is obtained through training. It is not limited to dependence on a sample label when a machine learning model is conventionally trained under supervision, and an image processing application scenario is expanded.

In an embodiment, the training stop condition may be that a number of times of training for the model reaches a preset number of times of training. When training the model, the computer device may count the number of times of training. When the preset number of times of training is reached, the computer device may determine that the model satisfies the training stop condition and end the training for the model.

In an embodiment, the training stop condition may further be that a discrimination performance indicator of an adjusted discrimination model reaches a preset indicator, and an image conversion performance indicator of an adjusted image conversion model reaches a preset indicator.

In an embodiment, the image processing method further includes steps of optimizing the first stage image conversion model. The steps of optimizing the first stage image conversion model are specifically as follows: obtaining a first sample single stage conversion image outputted by the first stage image conversion model after the first sample passes through the first stage image conversion model; obtaining a second sample single stage conversion image outputted by the first stage image reverse conversion model after the second sample passes through the first stage image reverse conversion model; respectively inputting the first sample and the second sample single stage conversion image into a first stage image reverse conversion discrimination model, to respectively obtain a discrimination confidence of the first sample and a discrimination confidence of the second sample single stage conversion image; and respectively inputting the second sample and the first sample single stage conversion image into a first stage image conversion discrimination model, to respectively obtain a discrimination confidence of the second sample and a discrimination confidence of the first sample single stage conversion image.

The adjusting the first stage image conversion model and the first stage image reverse conversion model according to a difference between the first sample and the first sample single stage recovery image, and a difference between the second sample and the second sample single stage recovery image until training is ended in a case that a training stop condition is satisfied includes: adjusting, until training is ended in a case that the training stop condition is satisfied, the first stage image conversion discrimination model, the first stage image reverse conversion discrimination model, the first stage image conversion model and the first stage image reverse conversion model according to a direction of maximizing the discrimination confidence of the first sample and the discrimination confidence of the second sample, and a direction of minimizing the discrimination confidence of the second sample single stage conversion image, the discrimination confidence of the first sample single stage conversion image, the difference between the first sample and the first sample single stage recovery image, and the difference between the second sample and the second sample single stage recovery image.

The discrimination model is a machine learning model having a discrimination capability after being trained. In one embodiment, the first stage image conversion discrimination model is used for discriminating whether the input image is an image originally belonging to the second image category, and outputting a discrimination confidence of a discrimination result, that is, a first stage image conversion discrimination confidence. The first stage image reverse conversion discrimination model is used for discriminating whether the input image is an image originally belonging to the first image category, and outputting a discrimination confidence of a discrimination result, that is, a first stage image reverse conversion discrimination confidence.

The first stage image conversion discrimination confidence is in a one-to-one correspondence with the input image, and represents a credibility degree (i.e., the degree of credibility) at which the input image is an image originally belonging to the second image category. A higher discrimination confidence represents a higher probability that the input image is an image originally belonging to the second image category. The first stage image reverse conversion discrimination confidence is in a one-to-one correspondence with the input image, and represents a credibility degree at which the input image is an image originally belonging to the first image category. A higher discrimination confidence represents a higher probability that the input image is an image originally belonging to the first image category.

It may be understood that, in one embodiment, a manner of adversarial learning is used. It is hoped that the first stage image conversion model learns how to convert an input image of the first image category into an image of the second image category, and cause the generated image to be capable of cheating the first stage image conversion discrimination model, so that the first stage image conversion discrimination model determines that the input image is an image originally belonging to the second image category. It is hoped that the first stage image reverse conversion model learns how to convert an input image of the second image category into an image of the first image category, and cause the generated image to be capable of cheating the first stage image reverse conversion discrimination model, so that the first stage image reverse conversion discrimination model determines that the input image is an image originally belonging to the second image category.

Referring to FIG. 4, the computer device may input x' and $F_1(y')$ into a first stage image reverse conversion discrimination model $D_{x1}$, to obtain a discrimination confidence $D_{x1}(x')$ of x' and a discrimination confidence $D_{x1}(F_1(y'))$ of $F_1(y')$; and input y' and $G_1(x')$ into a first stage image conversion discrimination model $D_{y1}$, to obtain a discrimination confidence of $D_{y1}(y')$ of y' and a discrimination confidence $D_{y1}(G_1(x'))$ of $G_1(x')$.

In this case, in model training of the first stage, an adversarial learning constraint is expressed as:

$$L_{adv1}=\log(D_{y1}(y'))+\log(1-D_{y1}(G_1(x')))+\log(D_{x1}(x'))+ \log(1-D_{x1}(F_1(y'))) \quad (2)$$

$L_{adv1}$ is a loss function based on the adversarial learning constraint. A procedure of model training may include a procedure of adjusting model parameters of the first stage image conversion discrimination model and the first stage image reverse conversion discrimination model to maximize $L_{adv1}$. Maximizing $L_{adv1}$ is procedures of maximizing $D_{x1}$ (x') and $D_{y1}(y')$, and minimizing $D_{x1}(F_1(y'))$ and $D_{y1}(G_1(x'))$.

In a training procedure, optimizing the image conversion model and the discrimination model through an adversarial manner is expressed as:

$$G_1, F_1 = \underset{G_1,F_1}{\operatorname{argmin}}\left(\underset{D_{x1},D_{y1}}{\max}\ (L_{adv1}+\lambda_1 L_{cyc1})\right) \quad (3)$$

$\lambda_1$ is a cycle consistency constraint weight. Procedures of maximizing $L_{adv1}$ and minimizing $L_{cyc1}$ may be performed in turn. That is, during sampling of a sample, $L_{adv1}$ is maximized first, and then $L_{cyc1}$ is minimized. During sampling of a next sample, $L_{cyc1}$ is minimized first, and then $L_{adv1}$ is maximized.

In one embodiment, training of the image conversion model and training of the discrimination model are included. A procedure of training the image conversion model is learning how to convert an image of a category into an image of another category, and a procedure of training the discrimination model is learning to determine whether an input image is an original image or an image generated through the image conversion model. In this way, the image conversion model learns to generate an image that is more similar with the original image, to interfere the determining of the discrimination model, and the discrimination model learns to determine the original image and the generated image more precisely. The two models fight against each other and promote each other, so that performance of the model obtained through training is better, and as a result, when image conversion is performed by using the image conversion model obtained through training, a problem of image distortion can be greatly overcome, and an image conversion effect can be improved.

In an embodiment, a person skilled in the art may understand that, during training of the first stage image conversion model and the first stage image reverse conversion model under supervision, adversarial training may alternatively be performed with reference to the first stage image conversion discrimination model and the first stage image reverse conversion discrimination model.

In an embodiment, steps of training the second stage image conversion model are specifically as follows: making the first sample sequentially pass through the first stage image conversion model and the second stage image conversion model, to obtain a first sample first-order conversion image outputted by the first stage image conversion model, and a first sample second-order conversion image outputted by the second stage image conversion model; obtaining, according to the first sample first-order conversion image and the first sample second-order conversion image, a first sample conversion image corresponding to the first sample and belonging to the second image category; making the first sample conversion image sequentially pass through the first stage image reverse conversion model and a second stage image reverse conversion model, to obtain a first sample first-order recovery image outputted by the first stage image reverse conversion model, and a first sample second-order recovery image outputted by the second stage image reverse conversion model; obtaining, according to the first sample first-order recovery image and the first sample second-order recovery image, a first sample recovery image corresponding to the first sample and belonging to the first image category; making the second sample sequentially pass through the first stage image reverse conversion model and the second stage image reverse conversion model, to obtain a second sample first-order conversion image outputted by the first stage image reverse conversion model, and a second sample second-order conversion image outputted by the second stage image reverse conversion model; obtaining, according to the second sample first-order conversion image and the second sample second-order conversion image, a second sample conversion image corresponding to the second sample and belonging to the first image category; making the second sample conversion image sequentially pass through the first stage image conversion model and the second stage image conversion model, to obtain a second sample first-order recovery image outputted by the first stage image conversion model, and a second sample second-order recovery image outputted by the second stage image conversion model; obtaining, according to the second sample first-order recovery image and the second sample second-order recovery image, a second sample recovery image corresponding to the second sample and belonging to the second image category; and adjusting the second stage image conversion model and the second stage image reverse conversion model according to a difference between the first sample and the first sample recovery image, and a difference between the second sample and the second sample recovery image until training is ended in a case that a training stop condition is satisfied.

It may be understood that, during training of the second stage image conversion model, the first stage image conversion model has been trained completely, and can be directly used.

Figure 5:
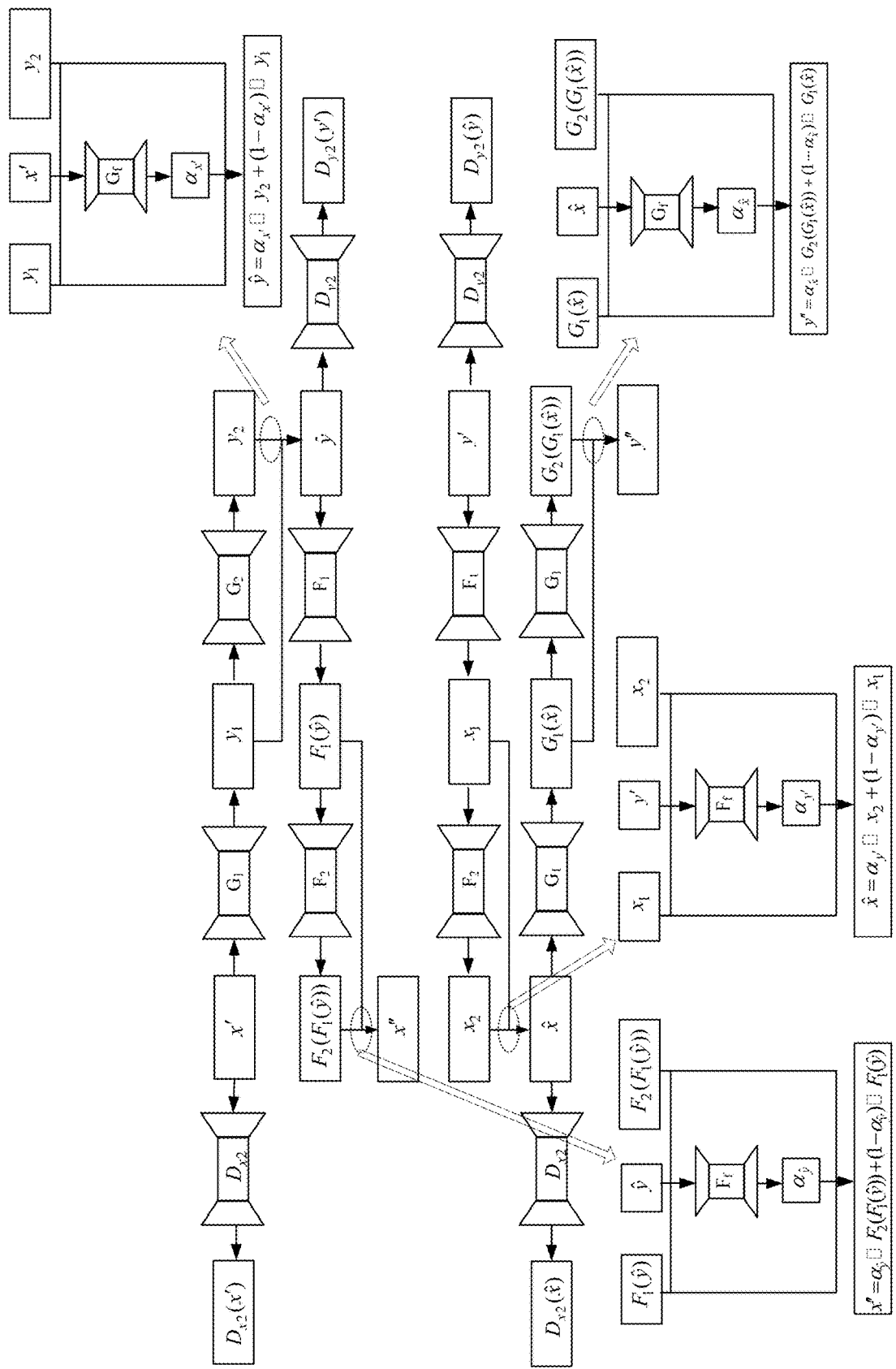
FIG. 5 is a schematic logical diagram of training a second stage image conversion model according to an embodiment of the present disclosure.

For example, FIG. 5 is a schematic logical diagram of training a second stage image conversion model according to an embodiment. Referring to FIG. 5, the computer device may obtain the first sample x' belonging to the first image category A, sequentially input x' into the first stage image conversion model G1, to obtain a first sample first-order conversion image $y_1=G_1(x')$, input y1 into the second stage image conversion model G2, to obtain a first sample second-order conversion image $y_2=G_2(y_1)$, and obtain, according to y1 and y2, a first sample conversion image $\hat{y}=G_f(x', y_1, y_2)$ corresponding to the first sample and belonging to the second image category. The computer device further inputs $\hat{y}$ into the first stage image reverse conversion model F1, to obtain a first sample first-order recovery image $F_1(\hat{y})$, inputs $F_1(\hat{y})$ into a second stage image reverse conversion model F2, to obtain a first sample second-order recovery image $F_2(F_1(\hat{y}))$, and obtain, according to $F_1(\hat{y})$ and $F_2(F_1(\hat{y}))$, a first sample recovery image $x''=F_f(\hat{y}, F_1(\hat{y}), F_2(F_1(\hat{y})))$ corresponding to the first sample and belonging to the first image category. In this case, x" is an image to be recovered to x'. It may be understood that, a training objective of the model is to minimize a difference between x" and x'.

The computer device may further obtain the second sample y' belonging to the second image category B, sequentially input y' into the first stage image reverse conversion model F1, to obtain a second sample first-order conversion image $x_1=F_1(y')$, input x1 into the second stage image reverse conversion model F2, to obtain a second sample second-order conversion image $x_2=F_2(x_1)$, and obtain, according to x1 and x2, a second sample conversion image $\hat{x}=F_f(y', x_1, x_2)$ corresponding to the second sample and belonging to the first image category. The computer device further inputs $\hat{x}$ into the first stage image conversion model G1, to obtain a second sample first-order recovery image $G_1(\hat{x})$, inputs $G_1(\hat{x})$ into the second stage image conversion model G2, to obtain a second sample second-order recovery image $G_2(G_1(\hat{x}))$, and obtains, according to $G_1(\hat{x})$ and $G_2(G_1(\hat{x}))$, a second sample recovery image $y''=G_f(\hat{x}, G_1(\hat{x}), G_2(G_1(\hat{x})))$ corresponding to the second sample and belonging to the second image category. In this case, y" is an image to be recovered to y'. It may be understood that, a training objective of the model is to minimize a difference between y" and y'.

In this case, in model training of the second stage, the cycle consistency constraint is expressed as:

$$L_{cyc2}=\|F_f(\hat{y},F_1(\hat{y}),F_2(F_1(\hat{y})))-x'\|_1+\|G_f(\hat{x},G_1(\hat{x}),G_2(G_1(\hat{x})))-y'\|_1 \quad (4)$$

$L_{cyc2}$ is a loss function based on cycle consistency. A procedure of model training may include a procedure of adjusting model parameters of the second stage image conversion model and the second stage image reverse conversion model to minimize $L_{cyc2}$.

In one embodiment, the machine learning model is trained without supervision by using the cycle consistency constraint, so that a machine learning model converting any two image categories of images into each other is obtained through training. It is not limited to dependence on a sample label when a machine learning model is conventionally trained under supervision, and an image processing application scenario is expanded.

In an embodiment, the image processing method further includes steps of optimizing the second stage image conversion model. The steps of optimizing the second stage image conversion model are specifically as follows: respectively inputting the first sample and the second sample conversion image into a second stage image reverse conversion discrimination model, to respectively obtain a discrimination confidence of the first sample and a discrimination confidence of the second sample conversion image; and respectively inputting the second sample and the first sample conversion image into a second stage image conversion discrimination model, to respectively obtain a discrimination confidence of the second sample and a discrimination confidence of the first sample conversion image.

The adjusting the second stage image conversion model and the second stage image reverse conversion model according to a difference between the first sample and the first sample recovery image, and a difference between the second sample and the second sample recovery image until training is ended in a case that a training stop condition is satisfied includes: adjusting, until training is ended in a case that the training stop condition is satisfied, the second stage image conversion discrimination model, the second stage image reverse conversion discrimination model, the second stage image conversion model and the second stage image reverse conversion model according to a direction of maximizing the discrimination confidence of the first sample and the discrimination confidence of the second sample, and a direction of minimizing the discrimination confidence of the second sample conversion image, the discrimination confidence of the first sample conversion image, the difference between the first sample and the first sample recovery image, and the difference between the second sample and the second sample recovery image.

Referring to FIG. 5, the computer device may input x' and $\hat{x}$ into a second stage image reverse conversion discrimination model $D_{x2}$, to obtain a discrimination confidence $D_{x2}(x')$ of x' and a discrimination confidence of $D_{x2}(\hat{x})$ of $\hat{x}$; and input y' and $\hat{y}$ into a second stage image conversion discrimination model $D_{y2}$, to obtain a discrimination confidence $D_{y2}(y')$ of y' and a discrimination confidence $D_{y2}(\hat{y})$ of $\hat{y}$.

In this case, in model training of the second stage, an adversarial learning constraint is expressed as:

$$L_{adv2}=\log(D_{y2}(y'))+\log(1-D_{y2}(\hat{y}))+\log(D_{x2}(x'))+\log(1-D_{x2}(\hat{x})) \quad (5)$$

$L_{adv2}$ is a loss function based on the adversarial learning constraint. A procedure of model training may include a procedure of adjusting model parameters of the second stage image conversion discrimination model and the second stage image reverse conversion discrimination model to maximize $L_{adv2}$. Maximizing $L_{adv2}$ is procedures of maximizing $D_{x2}$(x') and $D_{y2}$(y'), and minimizing $D_{x2}(\hat{x})$ and $D_{y2}(\hat{y})$.

In a training procedure of the second stage, optimizing the image conversion model and the discrimination model through an adversarial manner is expressed as:

$$G_2, F_2 = \operatorname*{argmin}_{G_2,F_2}\left(\max_{D_{x2},D_{y2}} (L_{adv2}+\lambda_2 L_{cyc2})\right) \quad (6)$$

$\lambda_2$ is a cycle consistency constraint weight. Procedures of maximizing $L_{adv2}$ and minimizing $L_{cyc2}$ may be performed in turn. That is, during sampling of a sample, $L_{adv2}$ is maximized first, and then $L_{cyc2}$ is minimized. During sampling of a next sample $L_{cyc2}$ is minimized first, and then $L_{adv2}$ is maximized.

In one embodiment, training of the image conversion model and training of the discrimination model are included. A procedure of training the image conversion model is learning how to convert an image of a category into an image of another category, and a procedure of training the discrimination model is learning to determine whether an input image is an original image or an image generated through the image conversion model. In this way, the image conversion model learns to generate an image that is more similar with the original image, to interfere the determining of the discrimination model, and the discrimination model learns to determine the original image and the generated image more precisely. The two models fight against each other and promote each other, so that performance of the model obtained through training is better, and as a result, when image conversion is performed by using the image conversion model obtained through training, a problem of image distortion can be greatly overcome, and an image conversion effect can be improved.

In an embodiment, a person skilled in the art may understand that, when the second stage image conversion model and the second stage image reverse conversion model are trained under supervision, adversarial training may alternatively be performed with reference to the second stage image conversion discrimination model and the second stage image reverse conversion discrimination model.

In an embodiment, the obtaining, according to the first sample first-order conversion image and the first sample second-order conversion image, a first sample conversion image corresponding to the first sample and belonging to the second image category includes: inputting the first sample, the first sample first-order conversion image, and the first sample second-order conversion image jointly into a first weight prediction model, to obtain a weight matrix corresponding to the first sample second-order conversion image; obtaining a weight matrix corresponding to the first sample first-order conversion image according to the weight matrix; and fusing the first sample first-order conversion image and the first sample second-order conversion image according to the respective corresponding weight matrices, to obtain the first sample conversion image corresponding to the first sample and belonging to the second image category.

The obtaining, according to the first sample first-order recovery image and the first sample second-order recovery image, a first sample recovery image corresponding to the first sample and belonging to the first image category includes: inputting the first sample conversion image, the first sample first-order recovery image, and the first sample second-order recovery image jointly into a second weight prediction model, to obtain a weight matrix corresponding to the first sample second-order recovery image; obtaining a weight matrix corresponding to the first sample first-order recovery image according to the weight matrix; and fusing the first sample first-order recovery image and the first sample second-order recovery image according to the respective corresponding weight matrices, to obtain the first sample recovery image corresponding to the first sample and belonging to the first image category.

The obtaining, according to the second sample first-order conversion image and the second sample second-order conversion image, a second sample conversion image corresponding to the second sample and belonging to the first image category includes: inputting the second sample, the second sample first-order conversion image, and the second sample second-order conversion image jointly into the second weight prediction model, to obtain a weight matrix corresponding to the second sample second-order conversion image; obtaining a weight matrix corresponding to the second sample first-order conversion image according to the weight matrix; and fusing the second sample first-order conversion image and the second sample second-order conversion image according to the respective corresponding weight matrices, to obtain the second sample conversion image corresponding to the second sample and belonging to the first image category.

The obtaining, according to the second sample first-order recovery image and the second sample second-order recovery image, a second sample recovery image corresponding to the second sample and belonging to the second image category includes: inputting the second sample conversion image, the second sample first-order recovery image, and the second sample second-order recovery image jointly into the first weight prediction model, to obtain a weight matrix corresponding to the second sample second-order recovery image; obtaining a weight matrix corresponding to the second sample first-order recovery image according to the weight matrix; and fusing the second sample first-order recovery image and the second sample second-order recovery image according to the respective corresponding weight matrices, to obtain the second sample recovery image corresponding to the second sample and belonging to the second image category.

The adjusting the second stage image conversion model and the second stage image reverse conversion model according to a difference between the first sample and the first sample recovery image, and a difference between the second sample and the second sample recovery image until training is ended in a case that a training stop condition is satisfied includes: adjusting the first weight prediction model, the second weight prediction model, the second stage image conversion model and the second stage image reverse conversion model according to the difference between the first sample and the first sample recovery image, and the difference between the second sample and the second sample recovery image until training is ended in a case that the training stop condition is satisfied.

Referring to FIG. 5, the computer device may input x', y1 and y2 jointly into the first weight prediction model Gf, to obtain a weight matrix $\alpha_{x'}$, which is outputted by Gf, of y2, and further obtain a weight matrix $(1-\alpha_{x'})$ of y1. In this case, a first sample conversion image is $\hat{y}=G_f(x', y_1, y_2)=\alpha_{x'} \sqcap y_2 + (1-\alpha_{x'}) \ ^- y_1$. The computer device may further input $\hat{y}$, $F_1(\hat{y})$ and $F_2(F_1(\hat{y}))$ jointly into a second weight prediction model Ff, to obtain a weight matrix $\alpha_{\hat{y}}$, which is outputted by Ff, of $F_2(F_1(\hat{y}))$, and further obtain a weight matrix $(1-\alpha_{\hat{y}})$ of $F_1(\hat{y})$. In this case, a first sample recovery image is $x''=F_f(\hat{y}, F_1(\hat{y}), F_2(F_1(\hat{y})))=\alpha_{\hat{y}} \ ^- F_2(F_1(\hat{y}))+(1-\alpha_{\hat{y}}) \ ^- F_1(\hat{y})$.

The computer device may input y', x1 and x2 jointly into the second weight prediction model Ff, to obtain a weight matrix $\alpha_{y'}$, which is outputted by Ff, of x2, and further obtain a weight matrix $(1-\alpha_{y'})$ of x1. In this case, the second sample conversion image is $\hat{x}=F_f(y', x_1, x_2)=\alpha_{y'} \sqcup x_2+(1-\alpha_{y'}) \_ x_1$. The computer device may further input $\hat{x}$, $G_1(\hat{x})$ and $G_2(G_1(\hat{x}))$ jointly into the first weight prediction model Gf, to obtain a weight matrix $\alpha_{\hat{x}}$, which is outputted by Gf, of $G_2(G_1(\hat{x}))$, and further obtain a weight matrix $(1-\alpha_{\hat{x}})$ of $G_1(\hat{x})$. In this case, the second sample recovery image is $y''=G_f(\hat{x}, G_1(\hat{x}), G_2(G_1(\hat{x})))=\alpha_{\hat{x}} \square G_2(G_1(\hat{x}))+(1\alpha_{\hat{x}}) \ ^- G_1(\hat{x})$.

In one embodiment, the machine learning model is trained without supervision by using the cycle consistency constraint, so that a machine learning model converting any two image categories of images into each other is obtained through training. It is not limited to dependence on a sample label when a machine learning model is conventionally trained under supervision, and an image processing application scenario is expanded.

Figure 6:
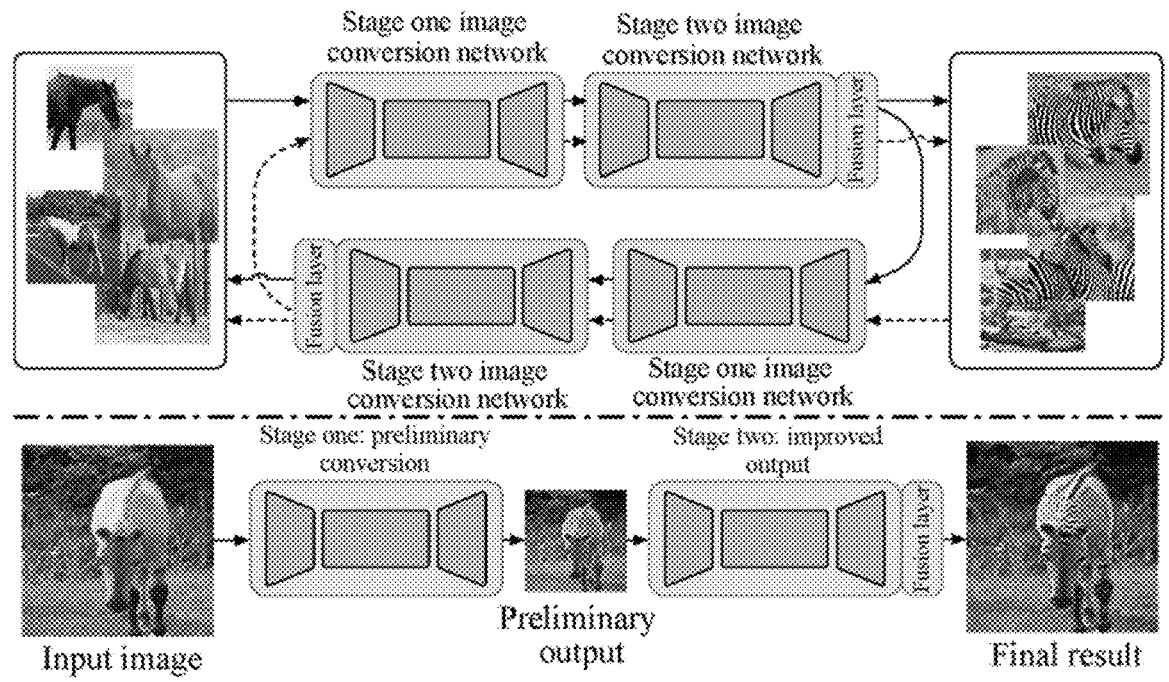
FIG. 6 is a schematic image diagram before and after image conversion according to an embodiment of the present disclosure.

FIG. 6 is a schematic image diagram before and after image conversion according to an embodiment. Referring to FIG. 6, an input image is an image of the first image category, and a horse in the input image is a horse of a single color. An output image is an image of the second image category, and a horse in the output image is a horse of a plurality of colors.

It is to be understood that, although the steps are displayed sequentially according to the instructions of the arrows in the flowcharts of the embodiments, these steps are not necessarily performed sequentially according to the sequence instructed by the arrows. Unless otherwise specifically described in the specification, there is no strict sequence limitation on the performance of these steps, and these steps may be performed in another sequence. In addition, at least a part of the steps in the foregoing embodiments may include a plurality of sub-steps or a plurality of stages. These sub-steps or stages are not necessarily performed and completed at the same time, and may be performed at different times. Besides, these sub-steps or stages may be not necessarily performed sequentially, and may be performed in turn or alternately with other steps or at least a part of sub-steps or stages of other steps.

Figure 7:
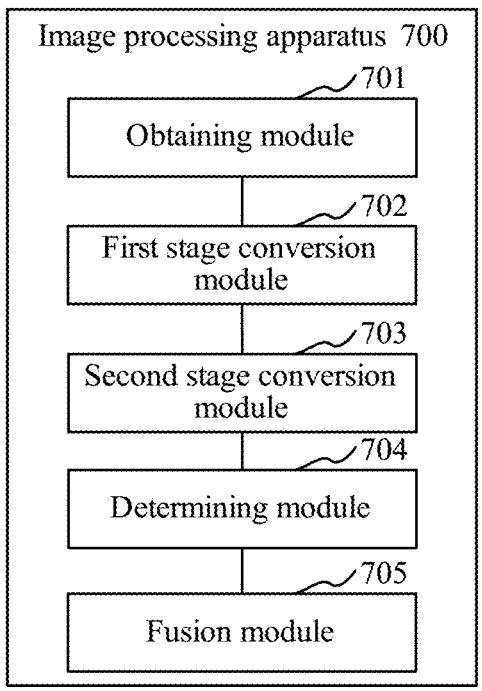
FIG. 7 is a structural diagram of modules of an image processing apparatus according to an embodiment of the present disclosure.

As shown in FIG. 7, in an embodiment, an image processing apparatus 700 is provided. Referring to FIG. 7, the image processing apparatus 700 includes: an obtaining module 701, a first stage conversion module 702, a second stage conversion module 703, a determining module 704, and a fusion module 705. All or some of the modules included in the image processing apparatus 700 may be implemented by software, hardware, or a combination thereof.

The obtaining module 701 is configured to obtain a to-be-processed image belonging to a first image category.

The first stage conversion module 702 is configured to input the to-be-processed image into a first stage image conversion model, to obtain a first intermediate image.

The second stage conversion module 703 is configured to convert the first intermediate image into a second intermediate image through a second stage image conversion model.

The determining module 704 is configured to determine a second weight matrix corresponding to the second intermediate image; and determine a first weight matrix corresponding to the first intermediate image.

The fusion module 705 is configured to fuse the first intermediate image and the second intermediate image according to the corresponding first weight matrix and second weight matrix, to obtain a target image corresponding to the to-be-processed image and belonging to a second image category.

In an embodiment, the first stage conversion module 702 is further configured to perform down-sampling on the to-be-processed image, to obtain a compressed image with a reduced image size; and input the compressed image into the first stage image conversion model, to output the first intermediate image with an image size that is the same as the image size of the compressed image. The second stage conversion module 703 is further configured to perform up-sampling on the first intermediate image, to obtain an enlarged image with an image size that is the same as an image size of the to-be-processed image; and input the enlarged image into the second stage image conversion model, to output the second intermediate image with an image size that is the same as the image size of the enlarged image.

In an embodiment, the determining module 704 is further configured to input the to-be-processed image, the first intermediate image and the second intermediate image jointly into a first weight prediction model, to obtain the second weight matrix corresponding to the second intermediate image; and obtain the first weight matrix corresponding to the first intermediate image according to the second weight matrix, a sum of the first weight matrix and the second weight matrix being a preset matrix.

In an embodiment, the fusion module 705 is further configured to multiply pixel values of the first intermediate image by matrix elements of the first weight matrix in bit, to obtain a first target image belonging to the second image category; multiply pixel values of the second intermediate image by matrix elements of the second weight matrix in bit, to obtain a second target image belonging to the second image category; and obtain, according to the first target image and the second target image, the target image corresponding to the to-be-processed image and belonging to the second image category.

Figure 8:
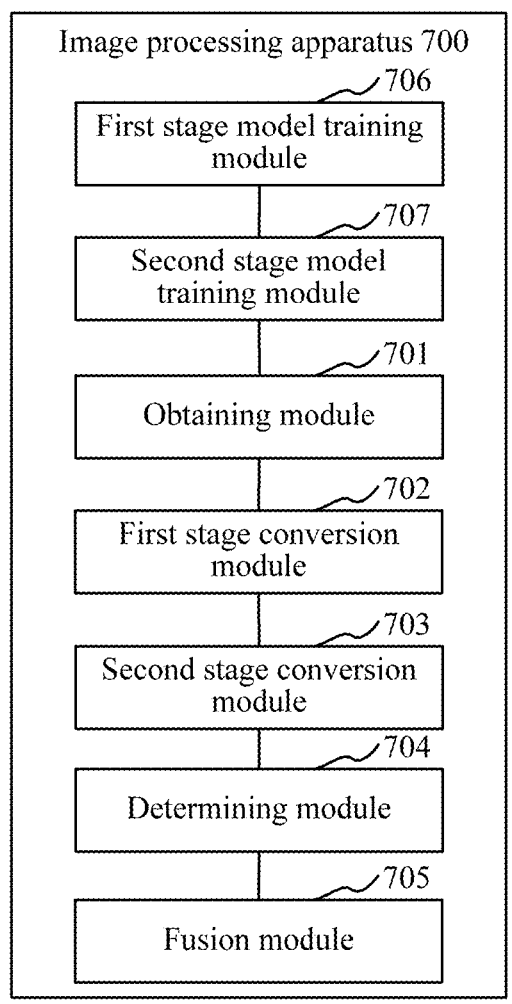
FIG. 8 is a structural diagram of modules of an image processing apparatus according to another embodiment of the present disclosure.

In an embodiment, as shown in FIG. 8, the image processing apparatus 700 further includes: a first stage model training module 706, configured to obtain a first sample belonging to the first image category and a second sample belonging to the second image category; make the first sample sequentially pass through the first stage image conversion model and a first stage image reverse conversion model, to obtain a first sample single stage recovery image; make the second sample sequentially pass through the first stage image reverse conversion model and the first stage image conversion model, to obtain a second sample single stage recovery image; and adjust the first stage image conversion model and the first stage image reverse conversion model according to a difference between the first sample and the first sample single stage recovery image, and a difference between the second sample and the second sample single stage recovery image until training is ended in a case that a training stop condition is satisfied.

In an embodiment, the first stage model training module 706 is further configured to obtain a first sample single stage conversion image outputted by the first stage image conversion model after the first sample passes through the first stage image conversion model; obtain a second sample single stage conversion image outputted by the first stage image reverse conversion model after the second sample passes through the first stage image reverse conversion model; respectively input the first sample and the second sample single stage conversion image into a first stage image reverse conversion discrimination model, to respectively obtain a discrimination confidence of the first sample and a discrimination confidence of the second sample single stage conversion image; and respectively input the second sample and the first sample single stage conversion image into a first stage image conversion discrimination model, to respectively obtain a discrimination confidence of the second sample and a discrimination confidence of the first sample single stage conversion image; and adjust, until training is ended in a case that the training stop condition is satisfied, the first stage image conversion discrimination model, the first stage image reverse conversion discrimination model, the first stage image conversion model and the first stage image reverse conversion model according to a direction of maximizing the discrimination confidence of the first sample and the discrimination confidence of the second sample, and a direction of minimizing the discrimination confidence of the second sample single stage conversion image, the discrimination confidence of the first sample single stage conversion image, the difference between the first sample and the first sample single stage recovery image, and the difference between the second sample and the second sample single stage recovery image.

As shown in FIG. 8, in an embodiment, the image processing apparatus 700 further includes a second stage model training module 707.

The second stage model training module 707 is configured to sequentially pass the first sample through the first stage image conversion model and the second stage image conversion model, to obtain a first sample first-order conversion image outputted by the first stage image conversion model, and a first sample second-order conversion image outputted by the second stage image conversion model; obtain, according to the first sample first-order conversion image and the first sample second-order conversion image, a first sample conversion image corresponding to the first sample and belonging to the second image category; sequentially pass the first sample conversion image through the first stage image reverse conversion model and a second stage image reverse conversion model, to obtain a first sample first-order recovery image outputted by the first stage image reverse conversion model, and a first sample second-order recovery image outputted by the second stage image reverse conversion model; obtain, according to the first sample first-order recovery image and the first sample second-order recovery image, a first sample recovery image corresponding to the first sample and belonging to the first image category; sequentially pass the second sample through the first stage image reverse conversion model and the second stage image reverse conversion model, to obtain a second sample first-order conversion image outputted by the first stage image reverse conversion model, and a second sample second-order conversion image outputted by the second stage image reverse conversion model; obtain, according to the second sample first-order conversion image and the second sample second-order conversion image, a second sample conversion image corresponding to the second sample and belonging to the first image category; sequentially pass the second sample conversion image through the first stage image conversion model and the second stage image conversion model, to obtain a second sample first-order recovery image outputted by the first stage image conversion model, and a second sample second-order recovery image outputted by the second stage image conversion model; obtain, according to the second sample first-order recovery image and the second sample second-order recovery image, a second sample recovery image corresponding to the second sample and belonging to the second image category; and adjust the second stage image conversion model and the second stage image reverse conversion model according to a difference between the first sample and the first sample recovery image, and a difference between the second sample and the second sample recovery image until training is ended in a case that a training stop condition is satisfied.

In an embodiment, the second stage model training module 707 is configured to respectively input the first sample and the second sample conversion image into a second stage image reverse conversion discrimination model, to respectively obtain a discrimination confidence of the first sample and a discrimination confidence of the second sample conversion image; and respectively input the second sample and the first sample conversion image into a second stage image conversion discrimination model, to respectively obtain a discrimination confidence of the second sample and a discrimination confidence of the first sample conversion image and adjust, until training is ended in a case that a training stop condition is satisfied, the second stage image conversion discrimination model, the second stage image reverse conversion discrimination model, the second stage image conversion model and the second stage image reverse conversion model according to a direction of maximizing the discrimination confidence of the first sample and the discrimination confidence of the second sample, and a direction of minimizing the discrimination confidence of the second sample conversion image, the discrimination confidence of the first sample conversion image, the difference between the first sample and the first sample recovery image, and the difference between the second sample and the second sample recovery image.

In an embodiment, the second stage model training module 707 is further configured to: input the first sample, the first sample first-order conversion image, and the first sample second-order conversion image jointly into a first weight prediction model, to obtain a weight matrix corresponding to the first sample second-order conversion image; obtain a weight matrix corresponding to the first sample first-order conversion image according to the weight matrix; and fuse the first sample first-order conversion image and the first sample second-order conversion image according to the respective corresponding weight matrices, to obtain the first sample conversion image corresponding to the first sample and belonging to the second image category; input the first sample conversion image, the first sample first-order recovery image, and the first sample second-order recovery image jointly into a second weight prediction model, to obtain a weight matrix corresponding to the first sample second-order recovery image; obtain a weight matrix corresponding to the first sample first-order recovery image according to the weight matrix; and fuse the first sample first-order recovery image and the first sample second-order recovery image according to the respective corresponding weight matrices, to obtain the first sample recovery image corresponding to the first sample and belonging to the first image category; input the second sample, the second sample first-order conversion image, and the second sample second-order conversion image jointly into the second weight prediction model, to obtain a weight matrix corresponding to the second sample second-order conversion image; obtain a weight matrix corresponding to the second sample first-order conversion image according to the weight matrix; and fuse the second sample first-order conversion image and the second sample second-order conversion image according to the respective corresponding weight matrices, to obtain the second sample conversion image corresponding to the second sample and belonging to the first image category; input the second sample conversion image, the second sample first-order recovery image, and the second sample second-order recovery image jointly into the first weight prediction model, to obtain a weight matrix corresponding to the second sample second-order recovery image; obtain a weight matrix corresponding to the second sample first-order recovery image according to the weight matrix; and fuse the second sample first-order recovery image and the second sample second-order recovery image according to the respective corresponding weight matrices, to obtain the second sample recovery image corresponding to the second sample and belonging to the second image category; and adjust the first weight prediction model, the second weight prediction model, the second stage image conversion model and the second stage image reverse conversion model according to the difference between the first sample and the first sample recovery image, and the difference between the second sample and the second sample recovery image until training is ended in a case that a training stop condition is satisfied.

Figure 9:
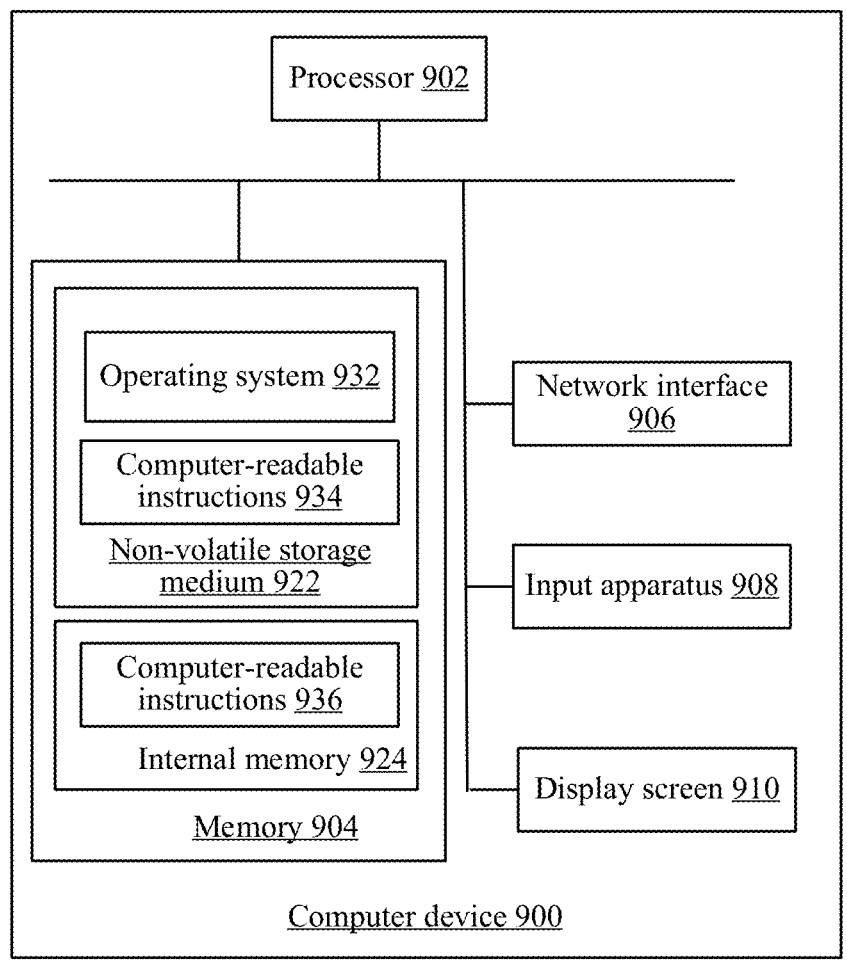
FIG. 9 is a diagram of an internal structure of a computer device according to an embodiment of the present disclosure.

FIG. 9 is a diagram of an internal structure of a computer device according to an embodiment. The computer device may be a user terminal. As shown in FIG. 9, the computer device 900 includes a processor 902, a memory 904, a network interface 906, an input device 908, and a display screen 910 that are connected through a system bus (not numbered). The memory 904 includes a non-volatile storage medium 922 and an internal memory 924. The non-volatile storage medium 922 of the computer device stores an operating system 932, and may further store computer programs or computer-readable instructions 934. The computer programs or the computer-readable instructions, when executed by the processor 902, may cause the processor 902 to perform the image processing method. The internal memory 924 may also store computer programs or computer-readable instructions 936, and the computer program or the computer-readable instruction, when executed by the processor 902, may cause the processor 902 to perform the image processing method. The display screen 910 of the computer device may be a liquid crystal display screen, an e-ink display screen, or the like. The input apparatus 908 may be a touch layer covering the display screen, or may be a button, a trackball, or a touchpad disposed on a housing of the computer device, or may be an external keyboard, touchpad, or mouse or the like. A person skilled in the art may understand that, the structure shown in FIG. 9 is only a block diagram of a part of a structure related to a solution of the present disclosure and does not limit the computer device to which the solution of the present disclosure is applied. Specifically, the computer device may include more or less members than those in the drawings, or include a combination of some members, or include different member layouts.

Figure 10:
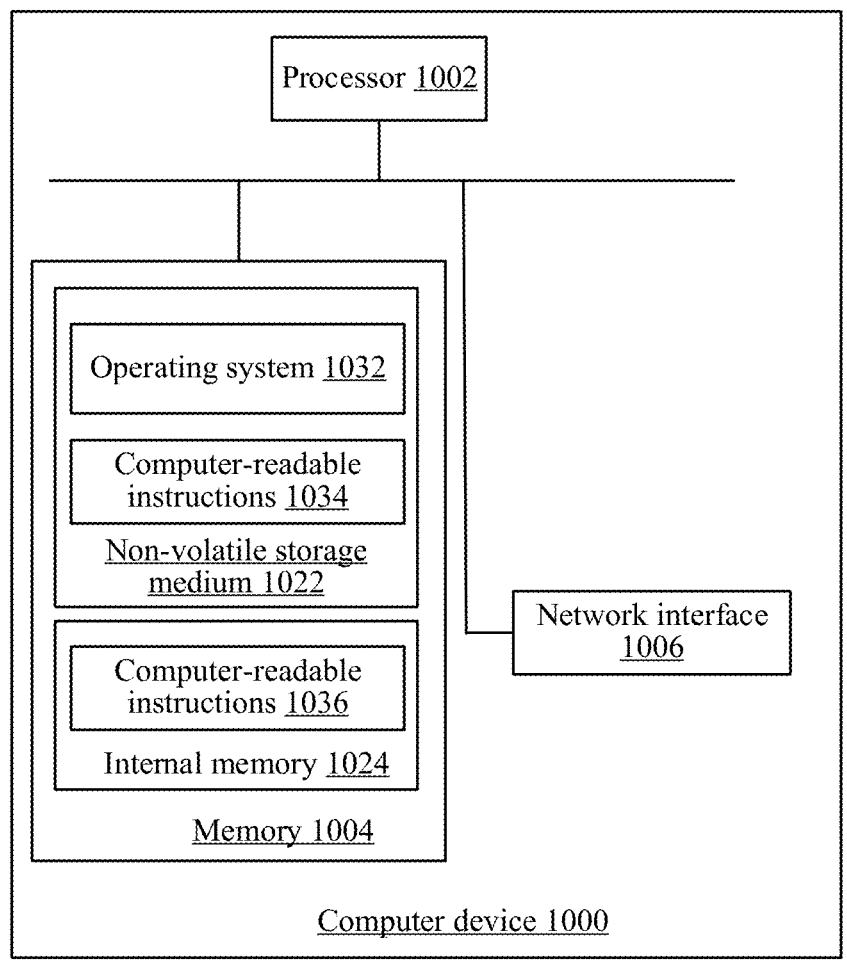
FIG. 10 is a diagram of an internal structure of a computer device according to another embodiment of the present disclosure.

FIG. 10 is a diagram of an internal structure of a computer device according to an embodiment. The computer device may be a user terminal or a server. As shown in FIG. 10, the computer device 1000 includes a processor 1002, a memory 1004, and a network interface 1006 that are connected through a system bus (not numbered). The memory 1004 includes a non-volatile storage medium 1022 and an internal memory 1024. The non-volatile storage medium 1022 of the computer device stores an operating system 1032, and may further store computer-readable instructions 1034. The computer-readable instructions, when executed by the processor 1002, may cause the processor 1002 to perform the image processing method. The internal memory 1024 may also store computer-readable instructions 1036, and the computer-readable instruction, when executed by the processor 1002, may cause the processor 1002 to perform the image processing method. A person skilled in the art may understand that, the structure shown in FIG. 10 is only a block diagram of a part of a structure related to a solution of the present disclosure and does not limit the computer device to which the solution of the present disclosure is applied. Specifically, the computer device may include more or less members than those in the drawings, or include a combination of some members, or include different member layouts.

In an embodiment, the image processing apparatus provided by the present disclosure may be implemented in a form of a computer-readable instruction. The computer-readable instruction may run on the computer device shown in FIG. 9 or FIG. 10. The non-volatile storage medium of the computer device may store the instruction modules, such as the obtaining module 701, the first stage conversion module 702, the second stage conversion module 703, the determining module 704, and the fusion module 705 shown in FIG. 7, constituting the image processing apparatus. The computer-readable instructions constituted by the instruction modules cause the processor to perform steps of the image processing method in the embodiments of the present disclosure.

For example, the computer device shown in FIG. 9 or FIG. 10 may obtain a to-be-processed image belonging to a first image category by using the obtaining module 701 in the image processing apparatus 700 shown in FIG. 7; input the to-be-processed image into a first stage image conversion model by using the first stage conversion module 702, to obtain a first intermediate image; convert the first intermediate image into a second intermediate image through a second stage image conversion model by using the second stage conversion module 703; respectively determine weight matrices respectively corresponding to the first intermediate image and the second intermediate image by using the determining module 704; and fuse the first intermediate image and the second intermediate image according to the respective corresponding weight matrices by using the fusion module 705, to obtain a target image corresponding to the to-be-processed image and belonging to a second image category.

In an embodiment, a computer-readable storage medium is provided. The computer-readable storage medium stores a computer-readable instruction, and the computer-readable instruction, when executed by a processor, causes a processor to perform the steps in the foregoing image processing method. The steps in the image processing method may be the steps in the image processing method in the foregoing embodiments.

In an embodiment, a computer device is provided, including: a memory and a processor. The memory stores a computer-readable instruction, and the computer-readable instruction, when executed by the processor, causes the processor to perform the steps in the foregoing image processing method. The steps in the image processing method may be the steps in the image processing method in the foregoing embodiments.

A person of ordinary skill in the art may understand that some or all procedures in the method in the foregoing embodiments may be implemented by a computer-readable instruction instructing related hardware, the program may be stored in a non-volatile computer readable storage medium, and when the program is executed, the procedures in the foregoing method embodiments may be implemented. Any reference to a memory, storage, database or another medium used in the various embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several implementations of the present disclosure, but they are not to be construed as a limit to the patent scope of the present disclosure. A person of ordinary skill in the art may make various changes and improvements without departing from the ideas of the present disclosure, which shall all fall within the protection scope of the present disclosure. Therefore, the protection scope of the patent of the present disclosure shall be subject to the appended claims.

What is claimed is:

1. An image processing method for a computer device, comprising:
    obtaining a to-be-processed image belonging to a first image category;
    inputting the to-be-processed image into a first stage image conversion model, to obtain a first intermediate image;
    converting the first intermediate image into a second intermediate image through a second stage image conversion model;
    determining a first weight matrix corresponding to the first intermediate image and a second weight matrix corresponding to the second intermediate image, by inputting the to-be-processed image, the first intermediate image and the second intermediate image jointly into a first weight prediction model; and
    fusing the first intermediate image and the second intermediate image according to the corresponding first weight matrix and second weight matrix, to obtain a target image corresponding to the to-be-processed image and belonging to a second image category, wherein a sum of the first weight matrix and the second weight matrix being a preset matrix.

2. The method according to claim 1, wherein:
    the inputting the to-be-processed image into a first stage image conversion model, to obtain a first intermediate image comprises:
        performing down-sampling on the to-be-processed image, to obtain a compressed image with a reduced image size; and
        inputting the compressed image into the first stage image conversion model, to output the first intermediate image; and
    the converting the first intermediate image into a second intermediate image through a second stage image conversion model comprises:
        performing up-sampling on the first intermediate image, to obtain an enlarged image processed image; and
        inputting the enlarged image into the second stage image conversion model, to output the second intermediate image.

3. The method according to claim 1, wherein the fusing the first intermediate image and the second intermediate image according to the corresponding first weight matrix and second weight matrix, to obtain a target image corresponding to the to-be-processed image and belonging to a second image category comprises:
    multiplying pixel values of the first intermediate image by matrix elements of the first weight matrix in bit, to obtain a first target image belonging to the second image category;
    multiplying pixel values of the second intermediate image by matrix elements of the second weight matrix in bit, to obtain a second target image belonging to the second image category; and
    obtaining, according to the first target image and the second target image, the target image corresponding to the to-be-processed image and belonging to the second image category.

4. The method according to claim 1, further comprising:
    obtaining a first sample belonging to the first image category and a second sample belonging to the second image category;
    making the first sample pass through the first stage image conversion model and a first stage image reverse conversion model, to obtain a first sample single stage recovery image;
    making the second sample pass through the first stage image reverse conversion model and the first stage image conversion model, to obtain a second sample single stage recovery image; and
    adjusting the first stage image conversion model and the first stage image reverse conversion model according to a difference between the first sample and the first sample single stage recovery image, and a difference between the second sample and the second sample single stage recovery image.

5. The method according to claim 4, further comprising:
    obtaining a first sample single stage conversion image outputted by the first stage image conversion model after the first sample passes through the first stage image conversion model;
    obtaining a second sample single stage conversion image outputted by the first stage image reverse conversion model after the second sample passes through the first stage image reverse conversion model;
    respectively inputting the first sample and the second sample single stage conversion image into a first stage image reverse conversion discrimination model, to respectively obtain a discrimination confidence of the first sample and a discrimination confidence of the second sample single stage conversion image; and
    respectively inputting the second sample and the first sample single stage conversion image into a first stage image conversion discrimination model, to respectively obtain a discrimination confidence of the second sample and a discrimination confidence of the first sample single stage conversion image.

6. The method according to claim 4, further comprising:
    making the first sample pass through the first stage image conversion model and the second stage image conversion model, to obtain a first sample first-order conversion image outputted by the first stage image conversion model, and a first sample second-order conversion image outputted by the second stage image conversion model;
    obtaining, according to the first sample first-order conversion image and the first sample second-order conversion image, a first sample conversion image corresponding to the first sample and belonging to the second image category;
    making the first sample conversion image pass through the first stage image reverse conversion model and a second stage image reverse conversion model, to obtain a first sample first-order recovery image outputted by the first stage image reverse conversion model, and a first sample second-order recovery image outputted by the second stage image reverse conversion model;
    obtaining, according to the first sample first-order recovery image and the first sample second-order recovery image, a first sample recovery image corresponding to the first sample and belonging to the first image category;
    making the second sample pass through the first stage image reverse conversion model and the second stage image reverse conversion model, to obtain a second sample first-order conversion image outputted by the first stage image reverse conversion model, and a second sample second-order conversion image outputted by the second stage image reverse conversion model;

obtaining, according to the second sample first-order conversion image and the second sample second-order conversion image, a second sample conversion image corresponding to the second sample and belonging to the first image category;

making the second sample conversion image pass through the first stage image conversion model and the second stage image conversion model, to obtain a second sample first-order recovery image outputted by the first stage image conversion model, and a second sample second-order recovery image outputted by the second stage image conversion model;

obtaining, according to the second sample first-order recovery image and the second sample second-order recovery image, a second sample recovery image corresponding to the second sample and belonging to the second image category; and adjusting the second stage image conversion model and the second stage image reverse conversion model according to a difference between the first sample and the first sample recovery image, and a difference between the second sample and the second sample recovery image.

7. The method according to claim 6, further comprising:
respectively inputting the first sample and the second sample conversion image into a second stage image reverse conversion discrimination model, to respectively obtain a discrimination confidence of the first sample and a discrimination confidence of the second sample conversion image; and respectively inputting the second sample and the first sample conversion image into a second stage image conversion discrimination model, to respectively obtain a discrimination confidence of the second sample and a discrimination confidence of the first sample conversion image.

8. The method according to claim 6, wherein:
the obtaining, according to the first sample first-order conversion image and the first sample second-order conversion image, a first sample conversion image corresponding to the first sample and belonging to the second image category comprises:
inputting the first sample, the first sample first-order conversion image, and the first sample second-order conversion image jointly into a first weight prediction model, to obtain a weight matrix corresponding to the first sample second-order conversion image;
obtaining a weight matrix corresponding to the first sample first-order conversion image according to the weight matrix; and
fusing the first sample first-order conversion image and the first sample second-order conversion image according to the respective corresponding weight matrices, to obtain the first sample conversion image corresponding to the first sample and belonging to the second image category; and the obtaining, according to the first sample first-order recovery image and the first sample second-order recovery image, a first sample recovery image corresponding to the first sample and belonging to the first image category comprises:
inputting the first sample conversion image, the first sample first-order recovery image, and the first sample second-order recovery image jointly into a second weight prediction model, to obtain a weight matrix corresponding to the first sample second-order recovery image;
obtaining a weight matrix corresponding to the first sample first-order recovery image according to the weight matrix; and fusing the first sample first-order recovery image and the first sample second-order recovery image according to the respective corresponding weight matrices, to obtain the first sample recovery image corresponding to the first sample and belonging to the first image category.

9. A computer device, comprising: a memory storing computer-readable instructions; and a processor coupled to the memory for executing the computer-readable instructions to perform:
obtaining a to-be-processed image belonging to a first image category;
inputting the to-be-processed image into a first stage image conversion model, to obtain a first intermediate image;
converting the first intermediate image into a second intermediate image through a second stage image conversion model;
determining a first weight matrix corresponding to the first intermediate image and a second weight matrix corresponding to the second intermediate image, by inputting the to-be-processed image, the first intermediate image and the second intermediate image jointly into a first weight prediction model;
and
fusing the first intermediate image and the second intermediate image according to the corresponding first weight matrix and second weight matrix, to obtain a target image corresponding to the to-be-processed image and belonging to a second image category, wherein a sum of the first weight matrix and the second weight matrix being a preset matrix.

10. The computer device according to claim 9, wherein:
the inputting the to-be-processed image into a first stage image conversion model, to obtain a first intermediate image comprises:
performing down-sampling on the to-be-processed image, to obtain a compressed image with a reduced image size; and
inputting the compressed image into the first stage image conversion model, to output the first intermediate image; and
the converting the first intermediate image into a second intermediate image through a second stage image conversion model comprises:
performing up-sampling on the first intermediate image, to obtain an enlarged image; and
inputting the enlarged image into the second stage image conversion model, to output the second intermediate image.

11. The computer device according to claim 10, wherein the fusing the first intermediate image and the second intermediate image according to the corresponding first weight matrix and second weight matrix, to obtain a target image corresponding to the to-be-processed image and belonging to a second image category comprises:
multiplying pixel values of the first intermediate image by matrix elements of the first weight matrix in bit, to obtain a first target image belonging to the second image category;

multiplying pixel values of the second intermediate image by matrix elements of the second weight matrix in bit, to obtain a second target image belonging to the second image category; and obtaining, according to the first target image and the second target image, the target image corresponding to the to-be-processed image and belonging to the second image category.

12. The computer device according to claim 9, wherein the processor further performs:

obtaining a first sample belonging to the first image category and a second sample belonging to the second image category;

making the first sample pass through the first stage image conversion model and a first stage image reverse conversion model, to obtain a first sample single stage recovery image;

making the second sample pass through the first stage image reverse conversion model and the first stage image conversion model, to obtain a second sample single stage recovery image; and adjusting the first stage image conversion model and the first stage image reverse conversion model according to a difference between the first sample and the first sample single stage recovery image, and a difference between the second sample and the second sample single stage recovery image.

13. The computer device according to claim 12, wherein: the processor further performs:

obtaining a first sample single stage conversion image outputted by the first stage image conversion model after the first sample passes through the first stage image conversion model;

obtaining a second sample single stage conversion image outputted by the first stage image reverse conversion model after the second sample passes through the first stage image reverse conversion model;

respectively inputting the first sample and the second sample single stage conversion image into a first stage image reverse conversion discrimination model, to respectively obtain a discrimination confidence of the first sample and a discrimination confidence of the second sample single stage conversion image; and respectively inputting the second sample and the first sample single stage conversion image into a first stage image conversion discrimination model, to respectively obtain a discrimination confidence of the second sample and a discrimination confidence of the first sample single stage conversion image.

14. The computer device according to claim 12, wherein the processor further performs:

making the first sample pass through the first stage image conversion model and the second stage image conversion model, to obtain a first sample first-order conversion image outputted by the first stage image conversion model, and a first sample second-order conversion image outputted by the second stage image conversion model;

obtaining, according to the first sample first-order conversion image and the first sample second-order conversion image, a first sample conversion image corresponding to the first sample and belonging to the second image category; making the first sample conversion image pass through the first stage image reverse conversion model and a second stage image reverse conversion model, to obtain a first sample first-order recovery image outputted by the first stage image reverse conversion model, and a first sample second-order recovery image outputted by the second stage image reverse conversion model;

obtaining, according to the first sample first-order recovery image and the first sample second-order recovery image, a first sample recovery image corresponding to the first sample and belonging to the first image category;

making the second sample pass through the first stage image reverse conversion model and the second stage image reverse conversion model, to obtain a second sample first-order conversion image outputted by the first stage image reverse conversion model, and a second sample second-order conversion image outputted by the second stage image reverse conversion model;

obtaining, according to the second sample first-order conversion image and the second sample second-order conversion image, a second sample conversion image corresponding to the second sample and belonging to the first image category;

making the second sample conversion image pass through the first stage image conversion model and the second stage image conversion model, to obtain a second sample first-order recovery image outputted by the first stage image conversion model, and a second sample second-order recovery image outputted by the second stage image conversion model;

obtaining, according to the second sample first-order recovery image and the second sample second-order recovery image, a second sample recovery image corresponding to the second sample and belonging to the second image category; and adjusting the second stage image conversion model and the second stage image reverse conversion model according to a difference between the first sample and the first sample recovery image, and a difference between the second sample and the second sample recovery image.

15. The computer device according to claim 14, wherein: the processor further performs:

respectively inputting the first sample and the second sample conversion image into a second stage image reverse conversion discrimination model, to respectively obtain a discrimination confidence of the first sample and a discrimination confidence of the second sample conversion image; and respectively inputting the second sample and the first sample conversion image into a second stage image conversion discrimination model, to respectively obtain a discrimination confidence of the second sample and a discrimination confidence of the first sample conversion image.

16. The computer device according to claim 14, wherein: the obtaining, according to the first sample first-order conversion image and the first sample second-order conversion image, a first sample conversion image corresponding to the first sample and belonging to the second image category comprises:

inputting the first sample, the first sample first-order conversion image, and the first sample second-order conversion image jointly into a first weight prediction model, to obtain a weight matrix corresponding to the first sample second-order conversion image;

obtaining a weight matrix corresponding to the first sample first-order conversion image according to the weight matrix; and fusing the first sample first-order conversion image and the first sample second-order conversion image according to the respective corresponding weight matrices, to obtain the first sample conversion image corresponding to the first sample and belonging to the second image category; and the obtaining, according to the first sample first-order recovery image and the first sample second-order recovery image, a first sample recovery image corresponding to the first sample and belonging to the first image category comprises:

inputting the first sample conversion image, the first sample first-order recovery image, and the first sample second-order recovery image jointly into a second weight prediction model, to obtain a weight matrix corresponding to the first sample second-order recovery image;

obtaining a weight matrix corresponding to the first sample first-order recovery image according to the weight matrix; and fusing the first sample first-order recovery image and the first sample second-order recovery image according to the respective corresponding weight matrices, to obtain the first sample recovery image corresponding to the first sample and belonging to the first image category; and the obtaining, according to the second sample first-order conversion image and the second sample second-order conversion image, a second sample conversion image corresponding to the second sample and belonging to the first image category comprises:

inputting the second sample, the second sample first-order conversion image, and the second sample second-order conversion image jointly into the second weight prediction model, to obtain a weight matrix corresponding to the second sample second-order conversion image;

obtaining a weight matrix corresponding to the second sample first-order conversion image according to the weight matrix; and fusing the second sample first-order conversion image and the second sample second-order conversion image according to the respective corresponding weight matrices, to obtain the second sample conversion image corresponding to the second sample and belonging to the first image category; and the obtaining, according to the second sample first-order recovery image and the second sample second-order recovery image, a second sample recovery image corresponding to the second sample and belonging to the second image category comprises:

inputting the second sample conversion image, the second sample first-order recovery image, and the second sample second-order recovery image jointly into the first weight prediction model, to obtain a weight matrix corresponding to the second sample second-order recovery image;

obtaining a weight matrix corresponding to the second sample first-order recovery image according to the weight matrix; and fusing the second sample first-order recovery image and the second sample second-order recovery image according to the respective corresponding weight matrices, to obtain the second sample recovery image corresponding to the second sample and belonging to the second image category.

17. A non-transitory computer-readable storage medium storing computer program instructions executable by at least one processor to perform:

obtaining a to-be-processed image belonging to a first image category;

inputting the to-be-processed image into a first stage image conversion model, to obtain a first intermediate image;

converting the first intermediate image into a second intermediate image through a second stage image conversion model;

determining a first weight matrix corresponding to the first intermediate image and a second weight matrix corresponding to the second intermediate image, by inputting the to-be-processed image, the first intermediate image and the second intermediate image jointly into a first weight prediction model; and fusing the first intermediate image and the second intermediate image according to the corresponding first weight matrix and second weight matrix, to obtain a target image corresponding to the to-be-processed image and belonging to a second image category, wherein a sum of the first weight matrix and the second weight matrix being a preset matrix.

18. The non-transitory computer-readable storage medium according to claim 17, wherein:

the inputting the to-be-processed image into a first stage image conversion model, to obtain a first intermediate image comprises:

performing down-sampling on the to-be-processed image, to obtain a compressed image with a reduced image size; and inputting the compressed image into the first stage image conversion model, to output the first intermediate image; and the converting the first intermediate image into a second intermediate image through a second stage image conversion model comprises:

performing up-sampling on the first intermediate image, to obtain an enlarged image; and inputting the enlarged image into the second stage image conversion model, to output the second intermediate image.

* * * * *